United States Patent
Park et al.

(10) Patent No.: US 12,129,337 B2
(45) Date of Patent: Oct. 29, 2024

(54) POLYIMIDE PRECURSOR COMPOSITION AND POLYIMIDE FILM MANUFACTURED USING SAME

(71) Applicant: LG CHEM, LTD., Seoul (KR)

(72) Inventors: Jinyoung Park, Daejeon (KR); Chan Hyo Park, Daejeon (KR); Danbi Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 741 days.

(21) Appl. No.: 17/297,854

(22) PCT Filed: Feb. 10, 2020

(86) PCT No.: PCT/KR2020/001842
§ 371 (c)(1),
(2) Date: May 27, 2021

(87) PCT Pub. No.: WO2020/166913
PCT Pub. Date: Aug. 20, 2020

(65) Prior Publication Data
US 2022/0010069 A1    Jan. 13, 2022

(30) Foreign Application Priority Data

Feb. 14, 2019 (KR) .................. 10-2019-0017004
Jan. 17, 2020 (KR) .................. 10-2020-0006836

(51) Int. Cl.
*C08J 5/18* (2006.01)
*C08G 73/10* (2006.01)
*C08L 79/08* (2006.01)

(52) U.S. Cl.
CPC ....... *C08G 73/101* (2013.01); *C08G 73/1067* (2013.01); *C08J 5/18* (2013.01); *C08L 79/08* (2013.01); *C08L 2201/08* (2013.01); *C08L 2203/16* (2013.01); *C08L 2203/20* (2013.01)

(58) Field of Classification Search
USPC ....................................... 528/170
See application file for complete search history.

(56) References Cited

U.S. PATENT DOCUMENTS

| | | | |
|---|---|---|---|
| 5,115,090 A | 5/1992 | Sachdev et al. | |
| 5,310,862 A | 5/1994 | Nomura et al. | |
| 5,741,598 A | 4/1998 | Shiotani et al. | |
| 6,600,006 B2 | 7/2003 | Jung et al. | |
| 2009/0078204 A1 | 3/2009 | Kerr et al. | |
| 2009/0078453 A1 | 3/2009 | Jung | |
| 2013/0184406 A1 | 7/2013 | Miyazaki et al. | |
| 2014/0213724 A1 | 7/2014 | Miyamoto et al. | |
| 2014/0363687 A1 | 12/2014 | Nakayama et al. | |
| 2018/0215873 A1 | 8/2018 | Miyazaki et al. | |
| 2018/0362763 A1 | 12/2018 | Miyazaki et al. | |
| 2020/0165452 A1 | 5/2020 | Jeong et al. | |

FOREIGN PATENT DOCUMENTS

| | | | |
|---|---|---|---|
| CN | 101321807 A | 12/2008 | |
| CN | 101809196 A | 8/2010 | |
| CN | 103119085 A | 5/2013 | |
| CN | 103965625 A | 8/2014 | |
| CN | 104159975 A | 11/2014 | |
| CN | 105209182 A | 12/2015 | |
| CN | 108431135 A | 8/2018 | |
| CN | 108473677 A | 8/2018 | |
| JP | H02-224824 A | 9/1990 | |
| JP | H09-040775 A | 2/1997 | |
| JP | 2008-235515 A | 10/2008 | |
| JP | 2010-186134 A | 8/2010 | |
| JP | 2013-010340 A | 1/2013 | |
| JP | 2018-119122 A | 8/2018 | |
| JP | 2020-509127 A | 3/2020 | |
| KR | 10-2003-0085166 A | 11/2003 | |
| KR | 10-0523257 B1 | 10/2005 | |
| KR | 10-0786185 B1 | 12/2007 | |
| KR | 10-2016-0094551 A | 8/2016 | |
| KR | 10-2017-0079921 A | 7/2017 | |
| KR | 10-2017-0114366 A | 10/2017 | |
| KR | 10-1906394 B1 * | 10/2018 | |
| KR | 10-1907320 B1 | 10/2018 | |
| WO | 2012/043186 A | 4/2012 | |
| WO | 2017/099183 A | 6/2017 | |
| WO | WO-2019131884 A1 * | 7/2019 | ........... B05D 3/0209 |

OTHER PUBLICATIONS

WO 2019131884 A1 Machine Translation (Year: 2019).*
KR 10-1906394 B1 Machine Translation (Year: 2018).*
International Search Report issued for International Application No. PCT/KR2020/001842 on May 29, 2020, 4 pages.

* cited by examiner

*Primary Examiner* — Terressa Boykin
(74) *Attorney, Agent, or Firm* — ROTHWELL, FIGG, ERNST & MANBECK, P.C.

(57) ABSTRACT

The present invention relates to a polyimide precursor composition, and a polyimide film manufactured using same. According to the present invention, since a polyimide film is manufactured from a mixture of a polyimide precursor having a structure that is advantageous to surface charge accumulation and a polyimide precursor having a structure capable of exhibiting high heat-resistant characteristics, a flexible device using the polyimide film as a substrate can have both improved charge accumulation characteristics caused by an electric field to be generated during the operation of a TFT device and heat high heat-resistant characteristics.

17 Claims, 4 Drawing Sheets

[Fig. 1]
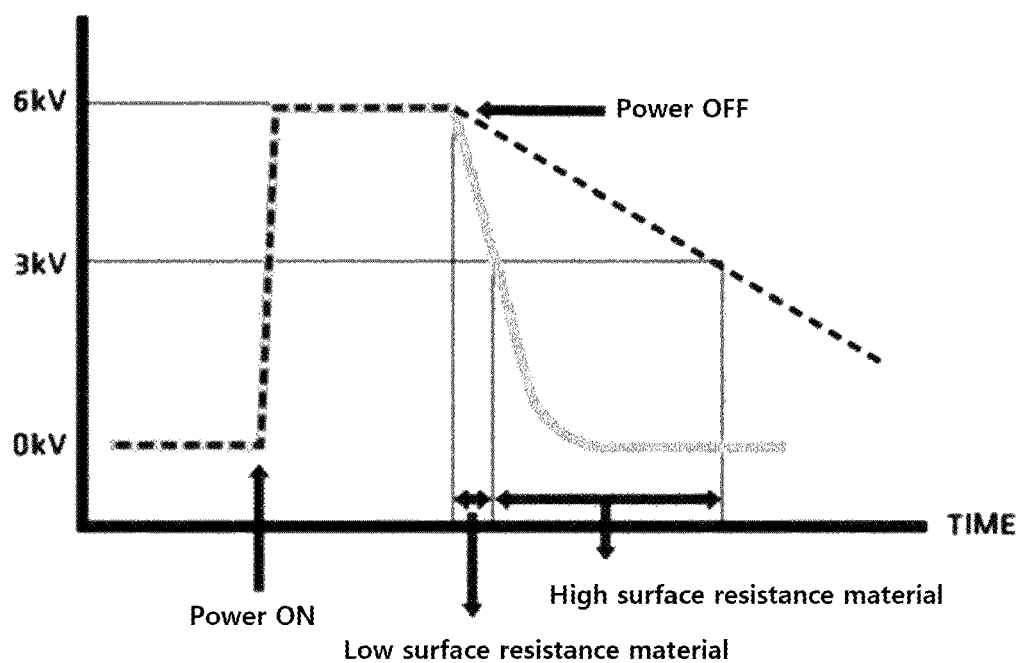

[Fig. 2]
A
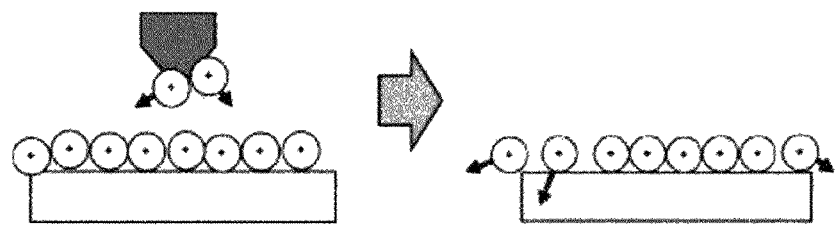
B
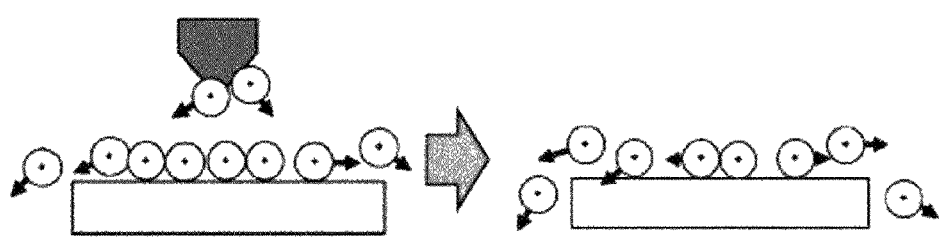

[Fig. 3]
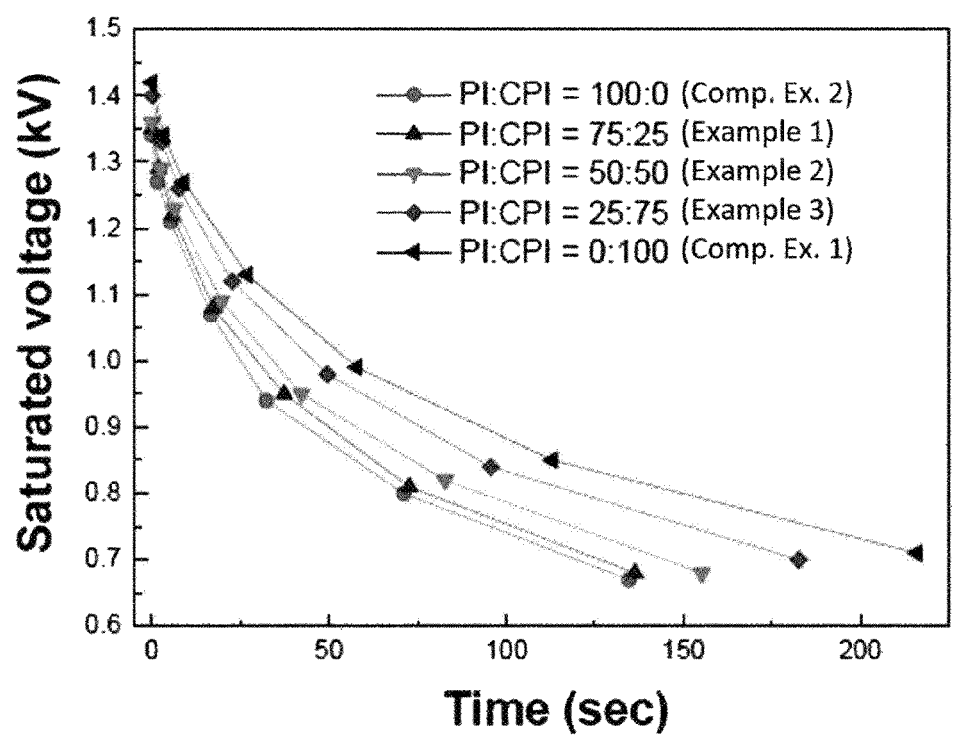

[Fig. 4]
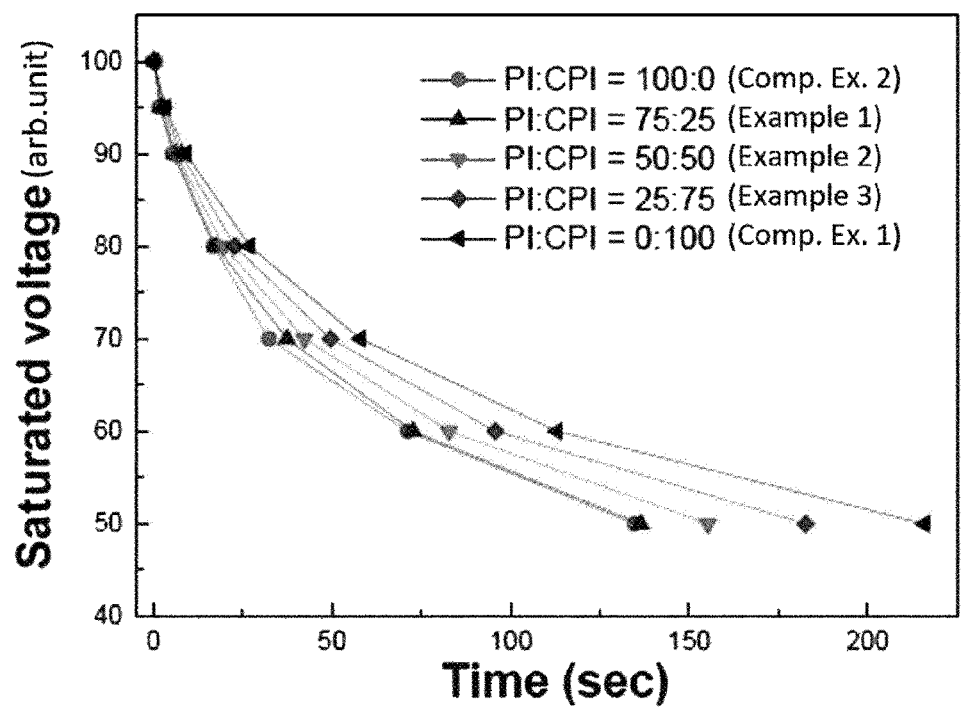

POLYIMIDE PRECURSOR COMPOSITION AND POLYIMIDE FILM MANUFACTURED USING SAME

CROSS-REFERENCE TO RELATED APPLICATIONS

This application is a 35 U.S.C. 371 National Phase Entry Application from PCT/KR2020/001842, filed on Feb. 10, 2020 and designating the United States, which claims the benefit of priorities to Korean Patent Application Nos. 10-2019-0017004, filed on Feb. 14, 2019 and 10-2020-0006836, filed on Jan. 17, 2020, the entire disclosures of which are incorporated herein by reference.

FIELD OF THE INVENTION

The present invention relates to a polyimide precursor composition and a polyimide film prepared by using the same, and more particularly, to a polyimide film having improved surface charge density characteristics and high heat resistance characteristics.

BACKGROUND

In recent years, weight reduction and miniaturization of products have been emphasized in the field of display. A currently used glass substrate is heavy and brittle and is difficult to apply to a continuous process. Accordingly, researches are actively carried out for applying a plastic substrate having advantages of lightness, flexibility, and applicability to continuous process and substitutable for a glass substrate, to a cell phone, a notebook and a PDA.

In particular, a polyimide (PI) resin has an advantage that it is easy to be synthesized, can be formed into a thin film and is suitable for a high temperature process. Recently, due to weight reduction and precision of electronic products, a polyimide is widely used as a material for integration in semiconductor such as LCD, PDP, etc. In particular, many studies have progressed for PI to apply to a flexible plastic display board having light and flexible characteristics.

A polyimide (PI) film, which is produced by film-forming the polyimide resin, is generally prepared by solution polymerization of aromatic dianhydride and aromatic diamine or aromatic diisocyanate to prepare a solution of polyamic acid derivative, coating the solution on a silicon wafer or a glass, and curing by heat treatment.

BRIEF SUMMARY OF THE INVENTION

The present invention provides a polyimide precursor composition for preparing a polyimide film having improved surface charge density characteristics and high heat resistance characteristics.

The present invention also provides a polyimide film prepared by using the polyimide precursor composition Still the present invention provides a flexible device using the polyimide film as a substrate and a method for producing the same.

There is provided a polyimide precursor composition comprising:
  a first polyamic acid having a repeating structure of the following formula 1 and having a reactive end capper; and
  a second polyamic acid having a repeating structure of the following formula 2:

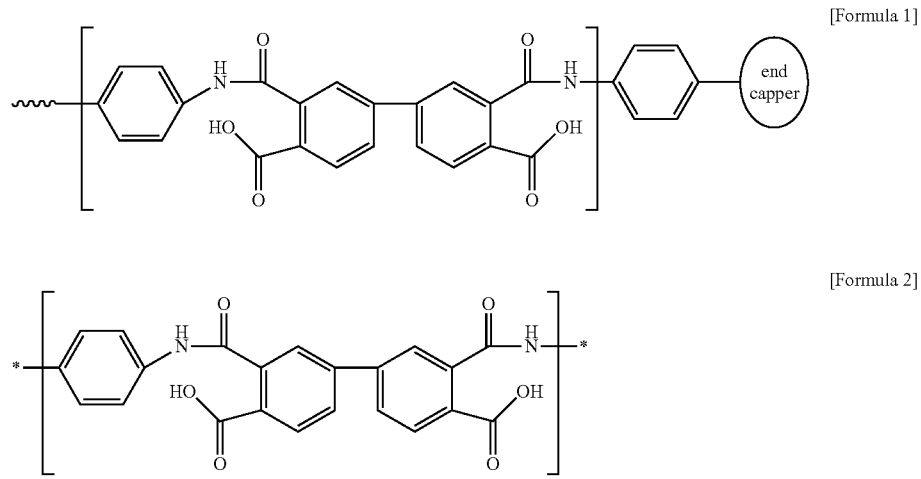

[Formula 1]

[Formula 2]

According to one embodiment, the reactive group of the end capper bound to the polyamic acid of the formula 1 may comprise a reactive structure selected from maleic-based, cyclobutene-based, acetylene-based, nadic-based, epoxy-based or phenylethynyl-based.

According to one embodiment, the reactive end capper bound to the polyamic acid of the formula 1 may be selected from the structures of the following structural formulas 1 to 6:

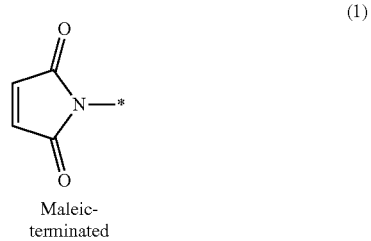

(1)

Maleic-terminated

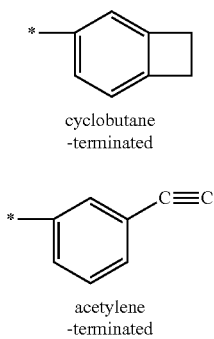

(2) cyclobutane-terminated (3) acetylene-terminated (4) nadic-terminated (5) epoxy-terminated

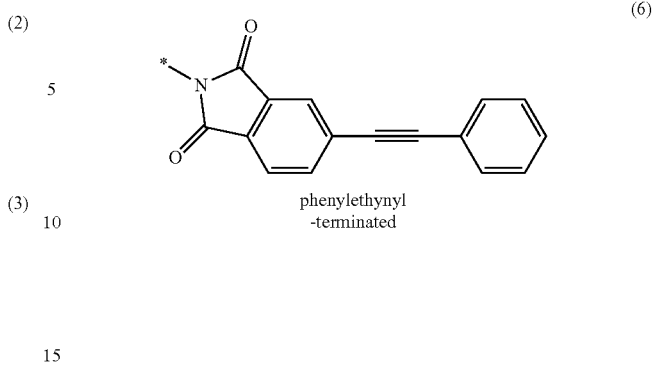

(6) phenylethynyl-terminated

According to one embodiment, the first polyamic acid and the second polyamic acid may be mixed in a molar ratio of 20:80 to 80:20.

According to one embodiment, the first polyamic acid and the second polyamic acid may comprise a reaction product of para-phenylenediamine and 3,3',4,4'-biphenylcarboxylic dianhydride, and the reaction product may be obtained by reacting para-phenylenediamine in excess of the equivalent ratio relative to 3,3',4,4'-biphenylcarboxylic dianhydride.

According to one embodiment, the first polyamic acid may be the reaction product obtained by reacting para-phenylenediamine with 3,3',4,4'-biphenylcarboxylic dianhydride in the presence of 1 to 10 moles of reactive end capper based on 100 moles of para-phenylenediamine.

In addition, there is provided a polyimide film comprising a cured product of the polyimide precursor composition.

According to one embodiment, the polyimide film may be manufactured by a method comprising:
  applying the polyimide precursor composition on a carrier substrate; and
  heating and curing the polyimide precursor composition.

According to one embodiment, the polyimide film may comprise:
  a first polyimide having a repeating structure of the following formula 1-1; and
  a second polyimide having a repeating structure of the following formula 2-1:

[Formula 1-1]

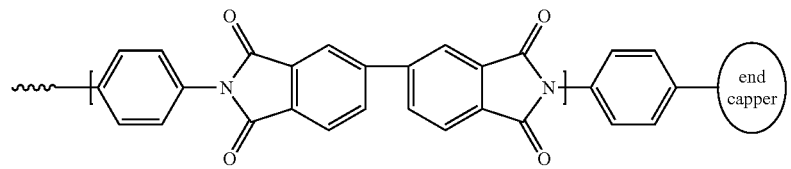

[Formula 2-1]

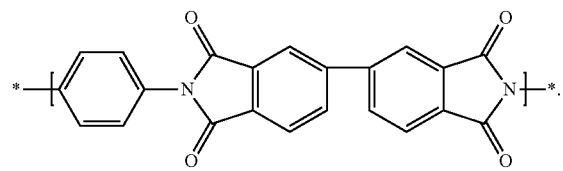

According to one embodiment, the first polyimide having the repeating structure of the formula 1-1 may comprise a cross-linked structure by a reactive functional group represented by following formula 1-1a.

[Formula 1-1a]

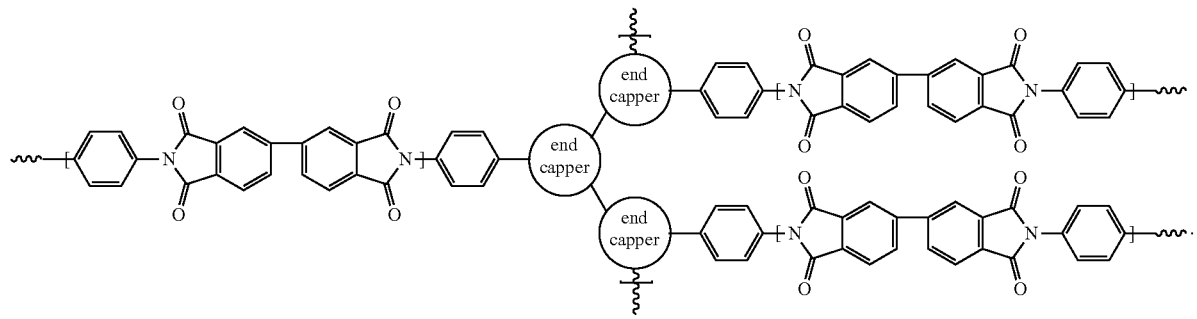

According to one embodiment, the polyimide film may have a saturated electrostatic voltage of at least 1.3 kV and a half-life time of at least 135 seconds as measured using a corona discharge method at a thickness of about 6 μm.

In addition, the present invention provides a flexible device comprising the polyimide film as a substrate.

In addition, the present invention provides a process for producing a flexible device comprising:
applying the polyimide precursor composition on a carrier substrate;
heating the polyimide precursor composition to imidize polyamic acid, thereby forming a polyimide film;
forming a device on the polyimide film; and
peeling off the polyimide film on which the device is formed from the carrier substrate.

According to one embodiment, the process may comprise an LTPS (low temperature polysilicon) process, an ITO process or an oxide process.

According to the present invention, by using the polyimide film prepared from a mixture of a polyimide precursor having a structure favorable for accumulating surface charges and a polyimide precursor having a structure capable of exhibiting high heat resistance, it is possible to improve charge accumulation by the electric field generated when driving the TFT device and improve high heat resistance characteristics simultaneously.

BRIEF DESCRIPTION OF THE DRAWINGS

FIG. 1 shows the measuring principle of charge-discharge characteristics according to the present invention.

FIG. 2 explains charge-discharge characteristics by corona discharge according to the difference in the surface resistance of the film.

FIG. 3 is a graph showing changes in saturated electrostatic voltage over time as measured by a corona discharge test for polyimide films according to Examples 1 to 3 and Comparative Examples 1 and 2.

FIG. 4 is a graph showing the rate of reduction of static electricity over time as measured by a corona discharge test for polyimide films according to Examples 1 to 3 and Comparative Examples 1 and 2.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

In the present specification, all compounds or organic groups may be substituted or un-substituted, unless otherwise specified. Herein, the term "substituted" means that at least one hydrogen contained in the compound or the organic group is substituted with a substituent selected from the group consisting of a halogen atom, an alkyl group or a halogenated alkyl group having 1 to 10 carbon atoms, a cycloalkyl group having 3 to 30 carbon atoms, an aryl group having 6 to 30 carbon atoms, a hydroxyl group, an alkoxy group having 1 to 10 carbon atoms, a carboxylic group, an aldehyde group, an epoxy group, a cyano group, a nitro group, an amino group, a sulfonic group or a derivative thereof.

Currently, in the display industry, a display device is manufactured using a plastic substrate instead of a glass substrate in order to reduce the weight and thickness of the substrate. In particular, a display device incorporating an OLED element on a plastic substrate has the advantage of being able to bend or fold.

However, in the production of a flexible display device using such plastics, problems such as an afterimage that did not occur when using a glass substrate have been raised. In addition, the glass substrate has high electrical insulation properties as well as high heat resistance and thermal conductivity compared to a plastic substrate.

The electrical insulation properties of the polymer material, which is a plastic substrate material, may cause image sticking due to variation in the characteristics of the TFT device due to the electric field of the device, which is due to the low surface charge accumulation phenomenon caused by the formation of carrier in the polymer due to the molecular structure of the polymer material, the presence of impurities incorporated during production, and the like.

Therefore, in order to use a plastic material such as polyimide as a substrate material for a flexible display, research and development are needed to improve the surface charge accumulation and leakage characteristics of the material.

In addition, since the manufacturing process of the flexible device involves a high temperature process, there is required heat resistance at high temperatures. In particular, an organic light emitting diode (OLED) device manufactured using a low temperature polysilicon (LTPS) process may have a process temperature close to 500° C. Therefore, in order to manufacture a flexible device, there is required excellent heat resistance that does not cause thermal decomposition even in a high temperature process.

In order to solve the conventional problem, the present invention provides a polyimide precursor composition comprising:
a first polyamic acid having a repeating structure of the following formula 1 and having a reactive end capper; and
a second polyamic acid having a repeating structure of the following formula 2:

That is, according to the present invention, it is possible to produce a polyimide film having excellent surface charge accumulation characteristics and high heat resistance characteristics by using a mixture of two types of polyamic acids.

In the first polyamic acid, the end capper is a structure having a reactive functional group capable of crosslinking, for example, it may be a structure having a reactive group selected from maleic-based, cyclobutene-based, acetylene-based, nadic-based, epoxy-based or phenylethynyl-based.

According to one embodiment, the end capper may be selected from the structures of the following structural formulas 1 to 6, but is not limited thereto.

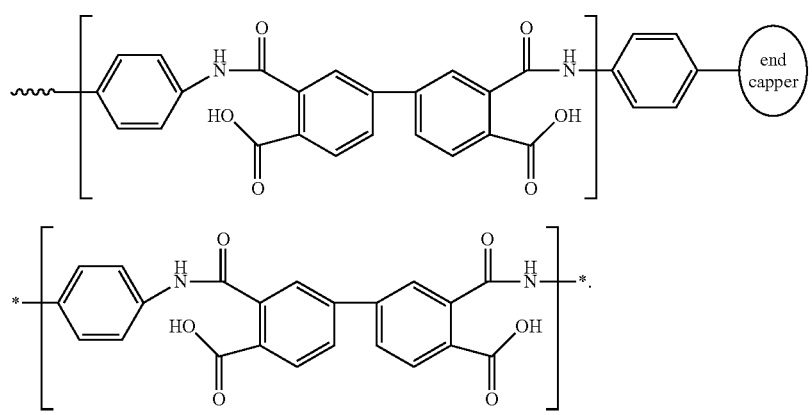

[Formula 1]

[Formula 2]

In the case of the polyimide prepared from a polyamic acid capable of forming a cross-linked structure such as a polyamic acid having a repeating structure of formula 1, it has a structure favorable for accumulating surface charges due to reduction of relation of chain mobility with orientation of polar group by electric field. However, there is a problem that the heat resistance tends to be low, and thus it is difficult to apply to a high thermal process for manufacturing a flexible OLED. On the other hand, in the case of the polyamic acid having a repeating structure of formula 2, it is used as a substrate of a flexible OLED due to its high heat resistance and mechanical properties and can be applied to a high thermal process which occurs in the manufacturing process, but it has the reduced surface charge accumulation due to its linear structure.

At this time, in the case of a polymer substrate material, surface charges are generated by an electric field applied by the formation of carriers in the polymer due to the molecular structure of the polymer material, the presence of impurities incorporated during production, and the like. Due to the generated surface charges, the leakage current is generated, which may affect the electrical characteristics of the TFT device.

In the present invention, by preparing a film with a polyimide derived from the first polyamic acid structure, the surface charge density due to surface charge accumulation can be increased and the leakage current due to attenuation of electrostatic charge can be minimized and thus problems such as the occurrence of afterimages resulting from the leakage current can be effectively suppressed, resulting in stable driving of the TFT device manufactured using this.

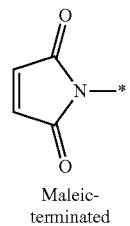

(1)

Maleic-terminated

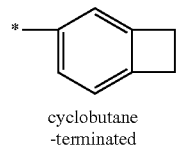

(2)

cyclobutane-terminated

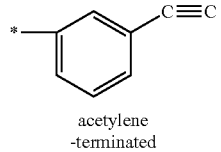

(3)

acetylene-terminated (4)

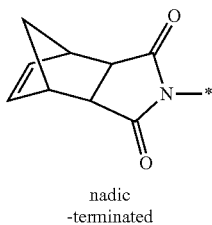

nadic
-terminated (5)

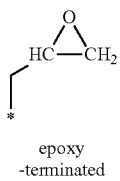

epoxy
-terminated (6)

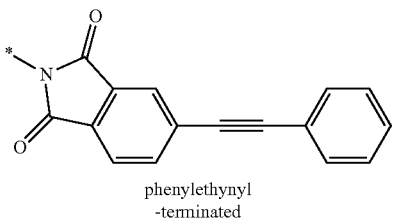

phenylethynyl
-terminated

The end capper may be used in an amount of 1 to 10 moles, or 1 mole or more, or 2 moles or more, or 3 moles or more and 10 moles or less, 9 moles or less, 8 moles or less, 7 moles or less, or 6 moles or less or 5 moles or less, relative to 100 moles of diamine used in the production of the first polyamic acid. When the end capper is used in an amount of less than 1 mole, the effect of reducing the electrostatic charge by the end capper may be insignificant, and when the end capper is used in an amount of more than 10 mole, the decrease in molecular weight by the end capper or the decrease in heat resistance by the unreacted end capper may occur.

The first polyamic acid and the second polyamic acid may be mixed in a predetermined ratio, for example, may be mixed in a molar ratio of 20:80 to 80:20 (first polyamic acid:second polyamic acid), preferably in a molar ratio of 30:70 to 80:20, or 40:60 to 80:20, or 50:50 to 80:20, or 30:70 to 70:30, or 40:60 to 70:30, or 50:50 to 70:30, or 30:70~60:40, or 40:60 to 60:40, or 50:50 to 60:40. Within the above range, a polyimide film having both of excellent surface charge characteristics and excellent heat resistance can be produced.

When the first polyamic acid containing the terminal group is present in an amount less than the above ratio, the saturation voltage and half-life may decrease to reduce surface charge characteristics, and when the second polyamic acid is present in an amount less than the above ratio, heat resistance may be deteriorated significantly.

The present invention provides a polyimide film produced from the polyimide precursor composition comprising a first polyamic acid having a repeating structure of the formula 1 and a second polyamic acid having a repeating structure of the formula 2.

For example, the polyimide film may be manufactured by a method comprising:
　applying the polyimide precursor composition comprising the polyimide precursor onto a carrier substrate; and
　heating and curing the polyimide precursor composition.

In addition, the polyimide film may comprise:
　a first polyimide having a repeating structure of the following formula 1-1; and
　a second polyimide having a repeating structure of the following formula 2-1:

[Formula 1-1]

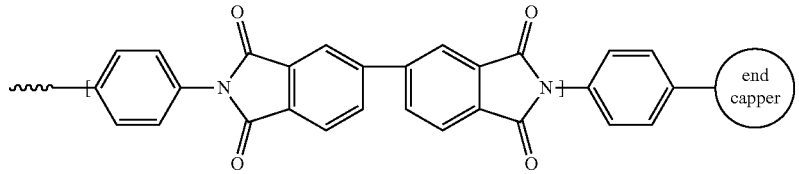

[Formula 2-1]

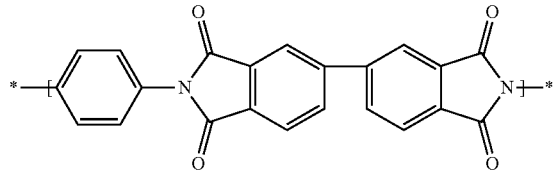

According to one embodiment, the first polyimide having the repeating structure may have the end capper cross-linked to each other, for example have the end capper cross-linked to each other as shown in the following formula 1-1a.

[Formula 1-1a]

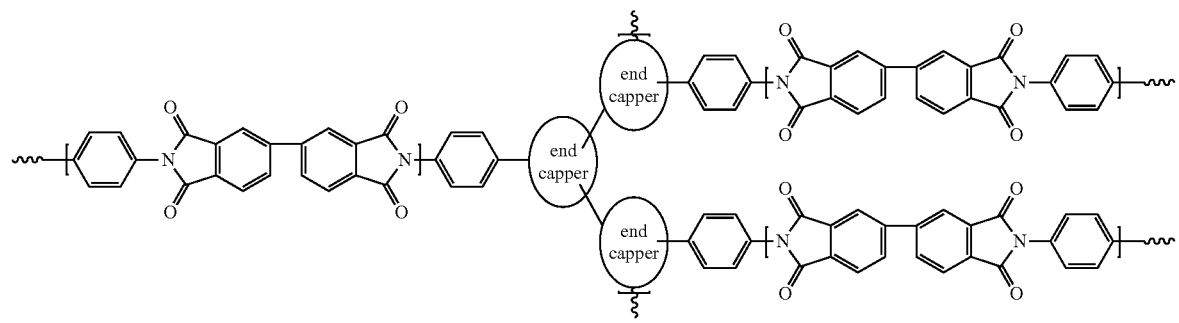

For example, when the end capper of the first polyimide contains a maleimide group, a crosslink structure may be formed by the moiety having a maleic end group, as shown in the following formula 1-1 b.

[Formula 1-1b]

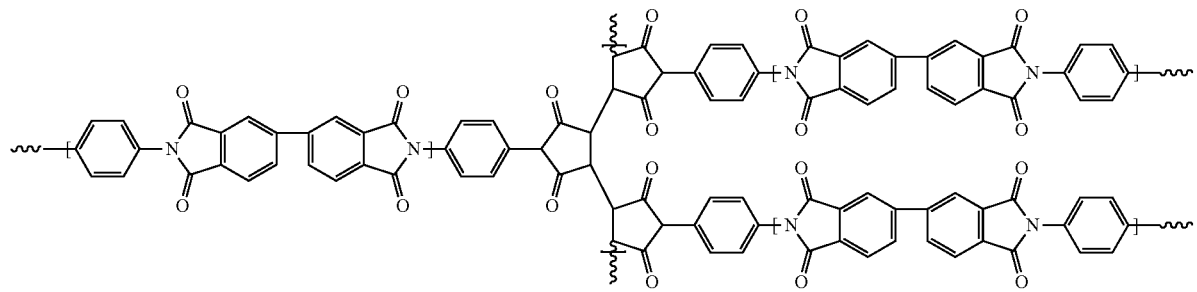

The polyimide film according to the present invention may have a thickness of 5 to 20 μm, or 6 to 16 μm, preferably 5 to 10 μm, a saturated electrostatic voltage of at least 1.3 kV, for example at least 1.35 kV and a half-life time of at least 135 seconds, preferably at least 140 seconds as measured using a corona discharge method at a thickness of about 6 μm.

According to one embodiment, the polyimide precursor composition may further comprise an additive for surface charge accumulation.

The additive may be a diisocyanate-based additive, for example, may be selected from methylenediphenyl 4,4'-diisocyanate and 1,4-phenylene diisocyanate.

According to one embodiment, the polyimide precursor composition may comprise a diisocyanate-based additive in an amount of 0.3 to 4% by weight, preferably 0.5 to 2% by weight based on the total weight of the polyimide precursor composition.

The additive can further form crosslinking between polyimide molecules as shown in Reaction Scheme 1 below, from which the surface charge density of the polyimide film may be increased.

[Reaction Scheme 1]

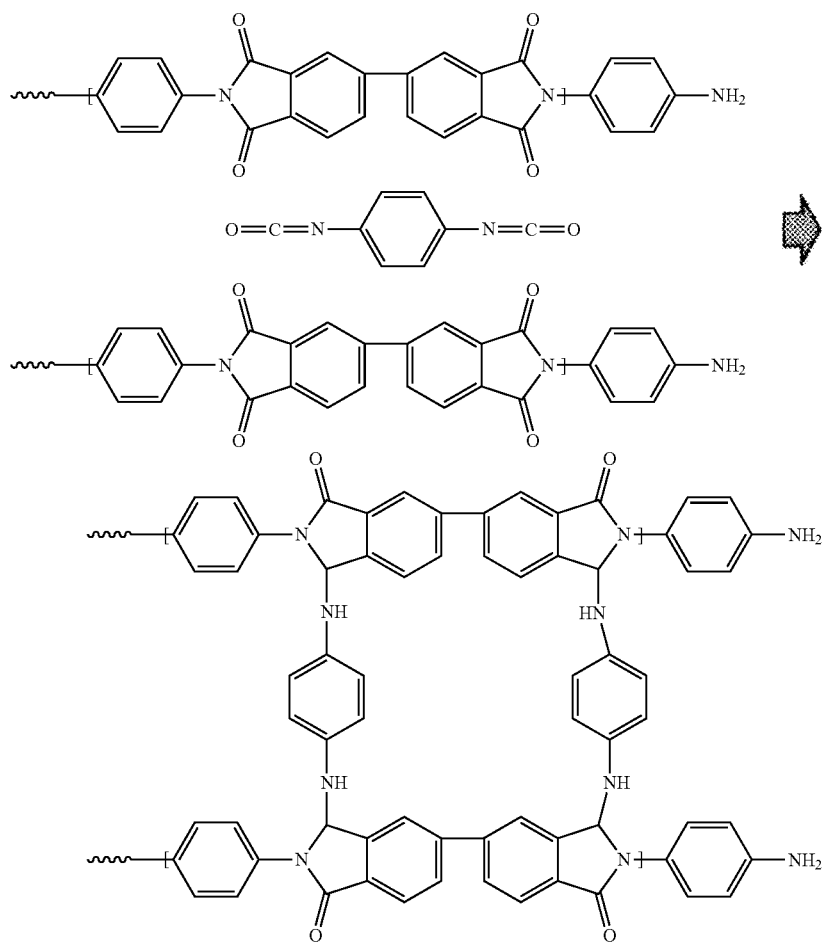

The surface charge accumulation and leakage characteristics of the polyimide film may be evaluated by a method comprising the following steps:
a) applying to a surface of the polyimide film a predetermined direct current voltage by corona discharge to accumulate electrostatic charges and detecting a voltage value due to the electrostatic charge;
b) measuring a voltage value when the detected voltage value reaches a saturated value and has no more change to obtain the saturated electrostatic voltage, and then stopping application of the corona discharge;
c) continuously detecting the potential value of the film when the application of corona discharge is stopped and measuring the time taken for the detected potential value for the saturated electrostatic voltage to become 50%, obtaining the half-life; and
d) determining the surface properties of the polymer film from whether the measured saturated electrostatic voltage and the half-life are greater than or equal to predetermined values.

According to the present invention, it is possible to measure the electrostatic properties of a sample from the characteristics that the saturated electrostatic voltage and half-life increase as the electrical insulating property of the polymer film increases.

At this time, the half-life refers to the time at which the voltage becomes ½ of the saturated electrostatic voltage after cutting off the power, and it can be used as an index showing the attenuation characteristics of electrostatic charge of the sample. For example, the greater the saturated voltage and the longer the half-life time, the slower the attenuation of electrostatic charge. The material having slower attenuation of electrostatic charge may exhibit higher surface insulation characteristics.

In general, the insulating properties of the polyimide film can be represented by the surface resistance value measured by a high-resistance meter. However, the surface resistance value of the film measured by such a high-resistance meter is $10^{14}\Omega$. In addition, the surface resistance values of the films show little difference for most polyimide substrates even with a difference in polymer structure, so the values are difficult to be distinguished or may have a very large error range.

In the present invention, since the saturated electrostatic voltage and half-life is measured to evaluate the charge accumulation and leakage characteristics of a polyimide film by using a charge-discharge method by corona discharge, the surface insulation properties between the polyimide films, which have been difficult to discriminate with conventional high-resistance meters, can be distinguished in more detail. Using this, it is possible to provide a more suitable polyimide film for a flexible display substrate.

The measurement of the saturated electrostatic voltage and half-life time according to the present invention can be measured using a charge-discharge meter. According to one embodiment, the DC voltage during charging by corona discharge may be 5 to 20 kV, for example, the DC voltage of 8 to 15 kV or 8 to 12 kV or about 10 kV are applied to generate corona discharge.

When the DC voltage by corona discharge is applied to the polyimide film, as shown in FIG. 1, the detected voltage value reaches a saturated value and has no more change at a specific voltage, and at this time the voltage is cut off. This saturated voltage is called "saturated electrostatic voltage". After cutting off the voltage, the potential attenuation state of the film is continuously measured, and the time taken for the potential to become ½ of the saturated electrostatic voltage is defined as a "half-life".

The long half-life means that attenuation of electrostatic charges accumulated in the polyimide film during charging occurs slowly, which may mean that the polyimide film has high insulating properties.

FIG. 2 explains charge-discharge characteristics by corona discharge according to the present invention. Referring to FIG. 2, in the case of the polyimide film (A) having a high saturated electrostatic voltage, the accumulation amount of electrostatic charge during charging increases, so that attenuation of electrostatic charge after charging is delayed, and thus half-life increases.

On the other hand, in the case of the polyimide film (B) having a low surface resistance, attenuation of electrostatic charges occurs during charging, so that attenuation of electrostatic charges after charging rapidly occurs, and thus half-life decreases.

Therefore, according to the present invention, by checking the electrostatic properties in combination of the charge-discharge characteristics, it is possible to more clearly measure insulation properties of the film, and from this, a polyimide film having high insulation properties can be produced.

According to one embodiment, in the preparation of the polyimide precursor, one or more tetracarboxylic dianhydrides other than biphenylcarboxylic dianhydride (BPDA) may be further used in addition to the first polyamic acid and the second polyamic acid.

For example, as the tetracarboxylic dianhydride, it may be used a tetracarboxylic dianhydride containing aliphatic, alicyclic or aromatic tetravalent organic group(s), or a combination thereof in the molecule, wherein the aliphatic, alicyclic or aromatic tetravalent organic group(s) is connected to each other via a crosslinking structure. Preferably, it may include an acid dianhydride having a structure having a monocyclic or polycyclic aromatic, monocyclic or polycyclic alicyclic group, or two or more of these connected by a single bond or a functional group. Alternatively, it may include a tetracarboxylic dianhydride comprising a tetravalent organic group having a rigid structure, such as a tetravalent organic group having aliphatic ring(s) or aromatic ring(s) in which each ring is a single ring structure, each ring is fused to form a heterocyclic structure, or each ring is connected by a single bond.

For example, the tetracarboxylic dianhydride may contain a tetravalent organic group selected from structures of the following formulas 3a to 3e.

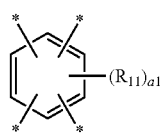

[Formula 3a]

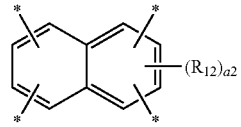

[Formula 3b]

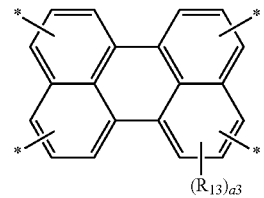

[Formula 3c]

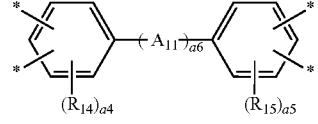

[Formula 3d]

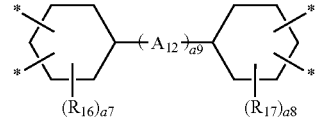

[Formula 3e]

In the formulas 3a to 3e, $R_{11}$ to $R_{17}$ are each independently a substituent selected from a halogen atom selected from —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, a1 is an integer of 0 to 2, a2 is an integer of 0 to 4, a3 is an integer of 0 to 8, a4 and a5 are each independently an integer of 0 to 3, a6 and a9 are each independently an integer of 0 to 3, and a7 and a8 are each independently an integer of 0 to 7, $A_{11}$ and $A_{12}$ are each independently selected from the group consisting of —O—, —CR'R"— (wherein, R' and R" are each independently selected from the group consisting of a hydrogen atom, an alkyl group having 1 to 10 carbon atoms (e.g., methyl group, ethyl group, propyl group, isopropyl group, n-butyl, tert-butyl group, pentyl group, etc.) and a haloalkyl group having 1 to 10 carbon atoms (e.g., trifluoromethyl group, etc.)), —C(=O)—, —C(=O)O—, —C(=O)NH—, —S—, —SO—, —SO$_2$—, —O[CH$_2$CH$_2$O]y- (y is an integer of 1 to 44), —NH(C=O)NH—, —NH(C=O)O—, a monocyclic or polycyclic cycloalkylene group having 6 to 18 carbon atoms (e.g., cyclohexylene group, etc.), a monocyclic or polycyclic arylene group having 6 to 18 carbon atoms (e.g., phenylene group, naphthalene group, fluorenylene group, etc.), and combinations thereof.

Alternatively, the tetracarboxylic dianhydride may comprise a tetravalent organic group selected from the group consisting of the following formulas 4a to 4n.

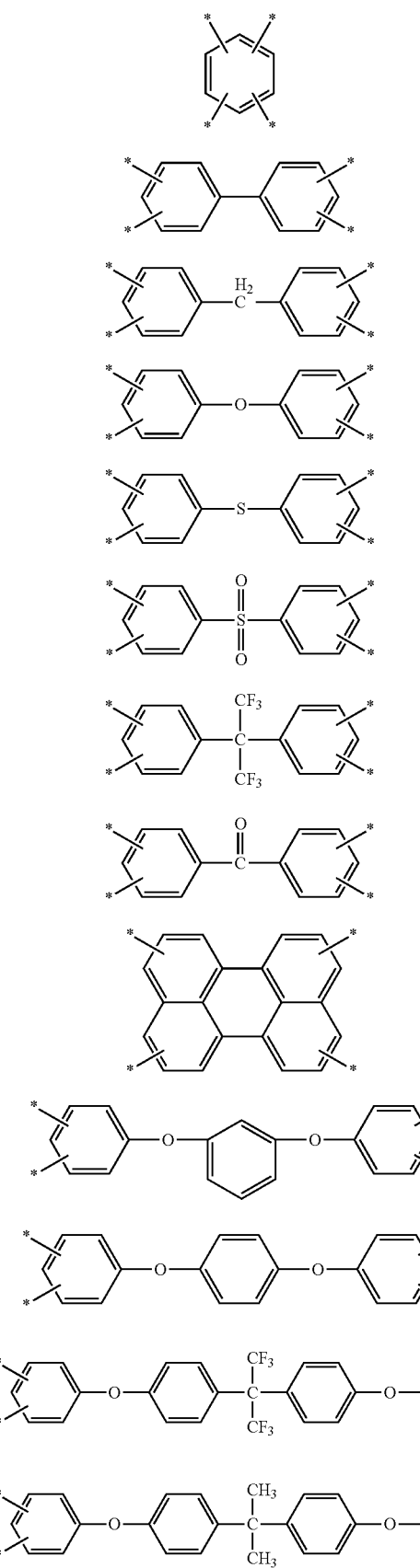

(4a)
(4b)
(4c)
(4d)
(4e)
(4f)
(4g)
(4h)
(4i)
(4j)
(4k)
(4l)
(4m)

-continued (4n)

At least one hydrogen atom in the tetravalent organic group of the formulas 4a to 4n may be substituted with a substituent selected from a halogen atom selected from —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms. For example, the halogen atom may be fluoro (—F), the halogenoalkyl group is a fluoroalkyl group having 1 to 10 carbon atoms containing a fluoro atom, selected from a fluoromethyl group, a perfluoroethyl group, a trifluoromethyl group, etc. The alkyl group may be selected from a methyl group, an ethyl group, a propyl group, an isopropyl group, a t-butyl group, a pentyl group, and a hexyl group, and the aryl group is selected from a phenyl group and a naphthalenyl group. More preferably, it may be substituted with a fluorine atom or a substituent containing a fluorine atom such as a fluoroalkyl group.

Preferably, the tetracarboxylic dianhydride may be a tetravalent organic group comprising aromatic ring(s) or aliphatic ring(s), in which each ring forms a rigid chain structure, i.e., each ring is a single ring structure, each ring is connected by a single bond, or each ring is directly connected to form a heterocyclic structure.

According to one embodiment, in the preparation of the polyimide precursor, one or more diamines other than phenylenediamine (PDA) may be further used in addition to the first polyamic acid and the second polyamic acid.

For example, it may include a diamine comprising a divalent organic group selected from a monocyclic or polycyclic aromatic divalent organic group having 6 to 24 carbon atoms, a monocyclic or polycyclic alicyclic divalent organic group having 6 to 18 carbon atoms, or a divalent organic group having two or more of them connected by a single bond or a functional group. Preferably, it may include a diamine comprising a divalent organic group having a rigid structure, such as a divalent organic group having aliphatic ring(s) or aromatic ring(s) in which each ring is a single ring structure, each ring is fused to form a heterocyclic structure, or each ring is connected by a single bond.

For example, the diamine may comprise a divalent organic group selected from the following formulas 5a to 5e.

[Formula 5a]

[Formula 5b]

[Formula 5c]

[Formula 5d]

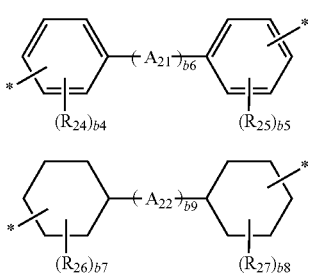

[Formula 5e]

In the formulas 5a to 5e, $R_{21}$ to $R_{27}$ are each independently a substituent selected from a halogen atom selected from —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, $A_{21}$ and $A_{22}$ are each independently selected from the group consisting of —O—, —CR'R"— (wherein, R' and R" are each independently selected from the group consisting of a hydrogen atom, an alkyl group having 1 to 10 carbon atoms (e.g., methyl group, ethyl group, propyl group, isopropyl group, n-butyl, tert-butyl group, pentyl group, etc.) and a haloalkyl group having 1 to 10 carbon atoms (e.g., trifluoromethyl group, etc.)), —C(=O)—, —C(=O)O—, —C(=O)NH—, —S—, —SO—, —SO$_2$—, —O[CH$_2$CH$_2$O]$_y$— (y is an integer of 1 to 44), —NH(C=O)NH—, —NH(C=O)O—, a monocyclic or polycyclic cycloalkylene group having 6 to 18 carbon atoms (e.g., cyclohexylene group, etc.), a monocyclic or polycyclic arylene group having 6 to 18 carbon atoms (e.g., phenylene group, naphthalene group, fluorenylene group, etc.), and combinations thereof, b1 is an integer from 0 to 4, b2 is an integer from 0 to 6, b3 is an integer from 0 to 3, b4 and b5 are each independently an integer from 0 to 4, and b7 and b8 are each independently an integer from 0 to 9, and b6 and b9 are each independently an integer from 0 to 3.

For example, the diamine may comprise a divalent organic group selected from the following formulas 6a to 6p.

(6a)
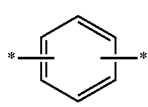

(6b)
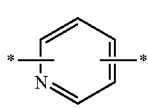

(6c)
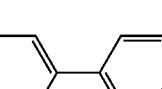

(6d)
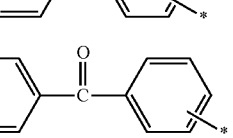

(6e)
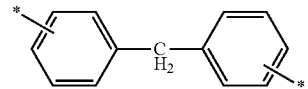

(6f)
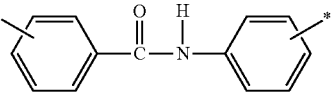

(6g)
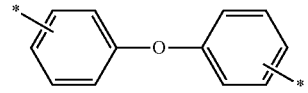

(6h)
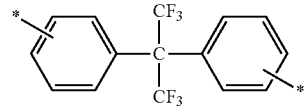

(6i)
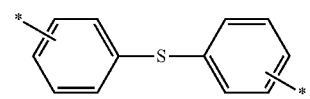

(6j)
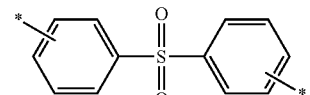

(6k)
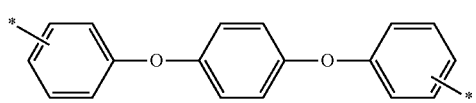

(6l)
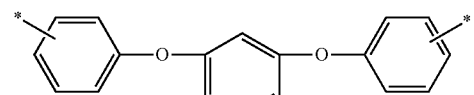

(6m)
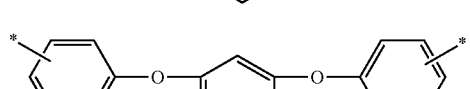

(6n)
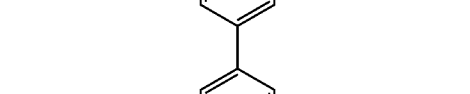

(6o)
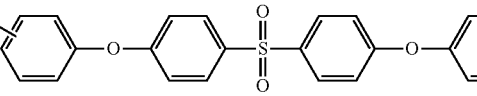

(6p)
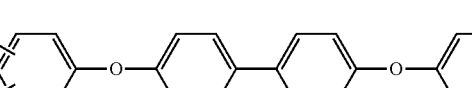

Alternatively, the diamine may comprise a divalent organic group in which aromatic ring(s) or aliphatic structure(s) form a rigid chain structure, for example, a divalent organic group having aliphatic ring(s) or aromatic ring(s) in which each ring is a single ring structure, each ring is connected by a single bond, or each ring is fused to form a heterocyclic structure.

According to one embodiment of the present invention, the total content of the tetracarboxylic dianhydride to the content of the diamine may be in a molar ratio of 1:1.1 to 1.1:1. In order to improve reactivity and processability, it is preferred that the content of the diamine is excessive relative to the total content of the tetracarboxylic dianhydride.

According to an embodiment of the present invention, the molar ratio of the total tetracarboxylic dianhydride and the diamine may be 1:0.98 to 0.98:1, preferably 1:0.98 to 0.98:1.

The polymerization reaction of acid dianhydride and diamine compound may be carried out by a conventional polymerization method of a polyimide or a precursor thereof, such as solution polymerization.

The organic solvent that can be used in the polymerization reaction of polyamic acid may include ketones such as gamma-butyrolactone, 1,3-dimethyl-2-imidazolidinone, methyl ethyl ketone, cyclohexanone, cyclopentanone and 4-hydroxy-4-methyl-2-pentanone; aromatic hydrocarbons such as toluene, xylene and tetramethylbenzene; glycol ethers (Cellosolve) such as ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether and triethylene glycol monoethyl ether; ethyl acetate, butyl acetate, ethylene glycol monoethyl ether acetate, ethylene glycol monobutyl ether acetate, diethylene glycol monoethyl ether acetate, dipropylene glycol monomethyl ether acetate, ethanol, propanol, ethylene glycol, propylene glycol, carbitol, dimethylpropionamide (DMPA), diethylpropionamide (DEPA), dimethylacetamide (DMAc), N,N-diethylacetamide, dimethylformamide (DMF), diethylformamide (DEF), N-methylpyrrolidone (NMP), N-ethylpyrrolidone (NEP), N,N-dimethylmethoxyacetamide, dimethylsulfoxide, pyridine, dimethylsulfone, hexamethylphosphoramide, tetramethylurea, N-methylcaprolactam, tetrahydrofuran, m-dioxane, p-dioxane, 1,2-dimethoxyethane, bis(2-methoxyethyl)ether, 1,2-bis(2-methoxyethoxy)ethane, bis[2-(2-methoxyethoxy)]ether, Equamide M100, Equamide B100 and the like, and these solvents may be used alone or as a mixture of two or more.

Preferably, sulfoxide-based solvents such as dimethyl sulfoxide and diethyl sulfoxide, formamide-based solvents such as N,N-dimethylformamide and N,N-diethylformamide, acetamide-based solvents such as N,N-dimethylacetamide and N,N-diethylacetamide, pyrrolidone-based solvents such as N-methyl-2-pyrrolidone, N-ethyl-2-pyrrolidone, and N-vinyl-2-pyrrolidone may be used alone or as a mixture, but the present invention is not limited thereto.

In addition, aromatic hydrocarbons such as xylene and toluene may be further used. In order to facilitate dissolution of the polymer, about 50% by weight or less of an alkali metal salt or an alkaline earth metal salt may be further added to the solvent based on the total amount of the solvent.

In addition, in the case of synthesizing polyamic acid or polyimide, an end-capping agent may be further added in which the terminal of the molecule reacts with dicarboxylic acid anhydride or monoamine to end-cap the polyimide in order to inactivate excess polyamino groups or acid anhydride groups.

The reaction of tetracarboxylic dianhydride and diamine may be carried out by a conventional polymerization method of polyimide precursor, such as solution polymerization. Specifically, it can be prepared by dissolving diamine in an organic solvent, followed by adding tetracarboxylic dianhydride to the resulting mixed solution to polymerize.

The polymerization reaction may be carried out in an inert gas or a nitrogen stream and may be carried out under anhydrous condition.

The reaction temperature during the polymerization reaction may be −20 to 80° C., preferably 0 to 80° C. If the reaction temperature is too high, the reactivity may become high and the molecular weight may become large, and the viscosity of the precursor composition may increase, which may be unfavorable in the process.

It is preferable that the polyamic acid solution prepared according to the above-mentioned manufacturing method contains a solid content in an amount such that the composition has an appropriate viscosity in consideration of processability such as coating property in the film forming process.

The polyimide precursor composition containing polyamic acid may be in the form of a solution dissolved in an organic solvent. For example, when the polyimide precursor is synthesized in an organic solvent, the solution may be the reaction solution as obtained, or may be obtained by diluting this reaction solution with another solvent. When the polyimide precursor is obtained as a solid powder, it may be dissolved in an organic solvent to prepare a solution.

According to one embodiment, the content of the composition may be adjusted by adding an organic solvent such that the total polyimide precursor content is 8 to 25% by weight, preferably 10 to 25% by weight, more preferably 10 to 20% by weight.

The polyimide precursor composition may be adjusted to have a viscosity of 1,500 cP or more, and the polyimide precursor composition may be adjusted to have a viscosity of 10,000 cP or less, preferably 4,000 cP or less, more preferably 2,000 cP or less. When the viscosity of the polyimide precursor composition is greater than 10,000 cP, the efficiency of defoaming during processing of the polyimide film is lowered. It results in not only the lowered efficiency of process but also the deteriorated surface roughness of the produced film due to bubble generation. It may lead to the deteriorated electrical, optical and mechanical properties.

Then, the polyimide precursor resulted from the polymerization reaction may be imidized to prepare a polyimide film.

According to one embodiment, the polyimide film may be manufactured by a method comprising:
  applying the polyimide precursor composition onto a substrate; and
  thermal treating the applied polyimide precursor composition.

As the substrate, a glass substrate, a metal substrate, a plastic substrate, or the like can be used without any particular limitation. Among them, a glass substrate may be preferable which is excellent in thermal and chemical stabilities during the imidization and curing process for the polyimide precursor and can be easily separated even without any treatment with additional release agent while not damaging the polyimide film formed after curing.

The applying process may be carried out according to a conventional application method. Specifically, a spin coating method, a bar coating method, a roll coating method, an air knife method, a gravure method, a reverse roll method, a kiss roll method, a doctor blade method, a spray method, a dipping method, a brushing method, or the like may be used. Of these, it is more preferable to carry out by a casting method which allows a continuous process and enables to increase an imidization rate of polyimide.

In addition, the polyimide precursor composition may be applied on the substrate in the thickness range such that the polyimide film to be finally produced has a thickness suitable for a display substrate.

Specifically, it may be applied in an amount such that the thickness is 5 to 20 μm or 6 to 16 μm. After the application of the polyimide precursor composition, a drying process for removing the solvent remained in the polyimide precursor composition may be further optionally performed prior to the curing process.

The drying process may be carried out according to a conventional method. Specifically, the drying process may be carried out at a temperature of 140° C. or lower, or from 80° C. to 140° C. If the drying temperature is lower than 80° C., the drying process becomes longer. If the drying temperature exceeds 140° C., the imidization proceeds rapidly, making it difficult to form a polyimide film having a uniform thickness.

Then, the polyimide precursor composition is applied on a substrate and heat-treated in an IR oven, in a hot air oven, or on a hot plate. The heat treatment temperature may range from 300 to 500° C., preferably from 320 to 480° C. The heat treatment may be performed in a single-step or multi-step heating process within the above temperature range. The heat treatment process may be performed for 20 to 70 minutes, and preferably for 20 to 60 minutes.

The polyimide film according to the present invention has a saturated electrostatic voltage of at least 1.3 kV and a half-life time of at least 135 seconds as measured using a corona discharge method and a thermal decomposition temperature (Td1%) of 570° C. or higher. By using the polyimide film, it is possible to provide a flexible substrate having both of the improved insulation property and the high heat resistance.

According to a preferred embodiment, the polyimide film may have a saturated electrostatic voltage of 1.35 kV or more, 1.36 kV or more, 1.38 kV or more, or 1.40 kV or more, and 1.5 kV or less, a half-life of 135 seconds or more, 136 seconds or more, 140 seconds or more, 150 seconds or more, 160 seconds or more, 170 seconds or more, or 180 seconds or more and 190 seconds or less, and a thermal decomposition (Td1%) temperature of 570° C. or more, 571° C. or more, or 572° C. or more and 575° C. or less.

The polyimide film according to the present invention can be particularly useful in the manufacture of flexible devices in electronic devices such as OLEDs, LCDs, electronic papers, and solar cells, and in particular, can be usefully used as a substrate for flexible devices.

In addition, the present invention provides a process for manufacturing a flexible device, comprising:
  applying a polyimide precursor composition on a carrier substrate;
  heating the polyimide precursor composition to imidize the polyamic acid, thereby forming a polyimide film;
  forming a device on the polyimide film; and
  peeling off the polyimide film on which the device is formed from the carrier substrate.

In particular, the process of manufacturing a flexible device may comprise a low temperature polysilicon (LTPS) process, an ITO process, or an oxide process.

For example, a flexible device including an LTPS layer may be obtained by forming the LTPS layer by an LTPS thin film manufacturing process, followed by peeling a carrier substrate and a polyimide film by laser lift-off or the like, the LTPS thin film manufacturing process comprising:
  forming a barrier layer comprising $SiO_2$ on the polyimide film;
  depositing an a-Si (amorphous silicon) thin film on the barrier layer;
  dehydrogen annealing by thermal treating the deposited a-Si thin film at a temperature of 450° C.±50° C.; and
  crystallizing the a-Si thin film with an excimer laser or the like.

The oxide thin film process may be heat treated at a lower temperature than the process using silicon, for example, the heat treatment temperature of the ITO TFT process may be 240° C.±50° C., and the heat treatment temperature of the oxide TFT process may be 350° C.±50° C.

Hereinafter, embodiments of the present invention will be described in detail so that those skilled in the art can easily carry out the present invention. The present invention may, however, be embodied in many different forms and should not be construed as limited to the embodiments set forth herein.

<Preparation Example 1> Polymerization of Polyamic Acid, BPDA-pPDA/MA(98:100:4)

After charging 100 g of NMP (N-methyl-2-pyrollidone) as an organic solvent into a reactor with nitrogen stream, 6.806 g (62.937 mmol) of para phenylenediamine (p-PDA) was dissolved while maintaining the temperature of the reactor at 25° C. At the same temperature, 18.147 g (61.679 mmol) of 3,3',4,4'-biphenyltetracarboxylic dianhydride (s-BPDA) and 54.8 g of NMP were added to the solution containing p-PDA, and dissolved with stirring for a certain time to polymerize a polyamic acid. Then, 0.247 g (2.517 mmol) of maleic anhydride (MA) was added to the polyamic acid solution and stirred for 4 hours to prepare a polyimide precursor having end capper (CPI).

<Preparation Example 2> Polymerization of Polyamic Acid, BPDA-pPDA(98:100)

After charging 100 g of NMP (N-methyl-2-pyrollidone) as an organic solvent into a reactor with nitrogen stream, 6.873 g (63.560 mmol) of para phenylenediamine (p-PDA) was dissolved while maintaining the temperature of the reactor at 25° C. At the same temperature, 18.327 g (62.289 mmol) of 3,3',4,4'-biphenyltetracarboxylic dianhydride (s-BPDA) and 54.8 g of NMP were added to the solution containing p-PDA, and dissolved with stirring for a certain time to prepare a polyimide precursor.

<Preparation Example 3> Polymerization of Polyamic Acid, BPDA-pPDA-ODA(99.88:50:50)

After charging 100 g of NMP (N-methyl-2-pyrollidone) as an organic solvent into a reactor with nitrogen stream, 3.041 g (28.121 mmol) of para phenylenediamine (p-PDA) and 5.631 g (28.121 mmol) of 4,4'-oxydianiline (ODA) were dissolved while maintaining the temperature of the reactor at 25° C. At the same temperature, 16.528 g (56.175 mmol) of 3,3',4,4'-biphenyltetracarboxylic dianhydride (s-BPDA) and 54.8 g of NMP were added to the solution and dissolved with stirring for a certain time to prepare a polyimide precursor.

<Preparation Example 4> Polymerization of Polyamic Acid, BPDA-pPDA-ODA(100:49.94:49.94)

After charging 100 g of NMP (N-methyl-2-pyrollidone) as an organic solvent into a reactor with nitrogen stream, 3.036 g (28.077 mmol) of para phenylenediamine (p-PDA) and 5.622 g (28.077 mmol) of 4,4'-oxydianiline (ODA) were dissolved while maintaining the temperature of the reactor at 25° C. At the same temperature, 16.542 g (56.222 mmol) of 3,3',4,4'-biphenyltetracarboxylic dianhydride (s-BPDA) and 54.8 g of NMP were added to the solution and dissolved with stirring for a certain time to prepare a polyimide precursor.

Comparative Example 1

A polyimide precursor solution was prepared by adding the organic solvent so that the solid content concentration of the polyimide precursor prepared from Preparation Example 1 was 11.8 wt %.

Comparative Example 2

A polyimide precursor solution was prepared by adding the organic solvent so that the solid content concentration of the polyimide precursor prepared from Preparation Example 2 was 11.8 wt %.

Comparative Example 3

A polyimide precursor solution was prepared by adding the organic solvent so that the solid content concentration of the polyimide precursor prepared from Preparation Example 3 was 11.8 wt %.

Comparative Example 4

A polyimide precursor solution was prepared by adding the organic solvent so that the solid content concentration of the polyimide precursor prepared from Preparation Example 4 was 11.8 wt %.

<Example 1> PI:CPI (75:25)

The polyimide precursor (CPI) prepared in Preparation Example 1 and the polyimide precursor (PI) prepared in Preparation Example 2 were mixed in a molar ratio of 25:75, and then the organic solvent was added so that the solid content concentration was 11.8 wt % to prepare a polyimide precursor solution.

<Example 2> PI:CPI (50:50)

The polyimide precursor (CPI) prepared in Preparation Example 1 and the polyimide precursor (PI) prepared in Preparation Example 2 were mixed in a molar ratio of 50:50, and then the organic solvent was added so that the solid content concentration was 11.8 wt % to prepare a polyimide precursor solution.

<Example 3> PI:CPI (25:75)

The polyimide precursor (CPI) prepared in Preparation Example 1 and the polyimide precursor (PI) prepared in Preparation Example 2 were mixed in a molar ratio of 75:25, and then the organic solvent was added so that the solid content concentration was 11.8 wt % to prepare a polyimide precursor solution.

<Comparative Example 5> PI:CPI (75:25)

The polyimide precursor (CPI) prepared in Preparation Example 1 and the polyimide precursor (PI) prepared in Preparation Example 3 were mixed in a molar ratio of 25:75, and then the organic solvent was added so that the solid content concentration was 11.8 wt % to prepare a polyimide precursor solution.

<Comparative Example 6> PI:CPI (50:50)

The polyimide precursor (CPI) prepared in Preparation Example 1 and the polyimide precursor (PI) prepared in Preparation Example 3 were mixed in a molar ratio of 50:50, and then the organic solvent was added so that the solid content concentration was 11.8 wt % to prepare a polyimide precursor solution.

<Comparative Example 7> PI:CPI (25:75)

The polyimide precursor (CPI) prepared in Preparation Example 1 and the polyimide precursor (PI) prepared in Preparation Example 3 were mixed in a molar ratio of 75:25, and then the organic solvent was added so that the solid content concentration was 11.8 wt % to prepare a polyimide precursor solution.

<Experimental Example 1> Measurement of Saturated Electrostatic Voltage and Half-Life Each of the polyimide precursor solutions prepared in Examples 1 to 3 and Comparative Examples 1 to 7 was spin coated on a glass substrate. The glass substrate coated with the polyimide precursor solution was placed in an oven, heated at a rate of 6° C./min and cured at 120° C. for 10 minutes and at 460° C. for 55 minutes. After the curing process was completed, the glass substrate was immersed in water to remove the film formed on the glass substrate and dried in an oven at 100° C. to prepare a film of polyimide having a thickness of 6 μm.

The measurement process of saturated electrostatic voltage and half-life by the corona discharge method is as follows.

The saturated electrostatic voltage and the half-life were measured using H-0110 Honestmeter manufactured by SHISHIDO ELECTROSTATIC at a temperature of 25° C. and a humidity of 40 to 50% according to the JIS L 1094 standard measurement method.

The applied voltage to each of the prepared polyimide films was set to 10 kV, and the distance from the tip of the needle electrode of the applying portion to the surface of the rotating disk was adjusted to 20 mm, and the distance from the electrode plate of the receiving portion to the surface of the rotating disk was adjusted to 15 mm. The application was started with applied voltage of 10 kV while rotating the rotating disk, and after 100 seconds the application was cut off. The time taken for the electrostatic voltage to attenuate to ½ was measured while rotating the rotating disk. The half-life was obtained by measuring the time taken for the value of the potential to decrease to 50% of the saturated electrostatic voltage value from cutting off the application. The measured saturated electrostatic voltage and half-life are shown in Table 1.

In addition, FIG. 3 and FIG. 4 are graphs showing changes in saturated electrostatic voltage and the rate of reduction of static electricity over time as measured by a corona discharge test for polyimide films according to Examples 1 to 3 and Comparative Examples 1 and 2, respectively.

<Experimental Example 2> Measurement of Thermal Decomposition Temperature (Td_1%)

Using a thermogravimetric analyzer (Discovery TGA, TA Instruments), the temperature when the initial weight of the polyimide film was reduced by 1% while heating at a heating rate of 10° C./min in a nitrogen atmosphere was measured. Table 1 shows the measured thermal decomposition temperature.

In Table 1, CPI refers to the polyamic acid prepared in Preparation Example 1 and PI refers to the polyamic acid prepared in Preparation Examples 2 to 4.

TABLE 1

| Sample | Thickness (μm) | Applied voltage (kV) | Saturated electrostatic voltage (kV) | Half-life time (sec) | Thermal properties Td_1% (° C.) |
|---|---|---|---|---|---|
| Comp. Ex. 1 PI:CPI (0:100) | 6 | 10 | 1.42 | 216 | 558.6 |
| Comp. Ex. 2 PI(Preparation 2):CPI (100:0) | 6 | 10 | 1.35 | 134 | 563.5 |
| Comp. Ex. 3 PI(Preparation 3):CPI (100:0) | 6 | 10 | 1.21 | 110 | 562.4 |
| Comp. Ex. 4 PI(Preparation 4):CPI (100:0) | 6 | 10 | 1.03 | 98 | 550.3 |
| Example 1 PI(Preparation 2):CPI (75:25) | 6 | 10 | 1.36 | 136 | 572.9 |
| Example 2 PI(Preparation 2):CPI (50:50) | 6 | 10 | 1.38 | 155 | 571.4 |
| Example 3 PI(Preparation 2):CPI (25:75) | 6 | 10 | 1.40 | 182 | 570.7 |
| Comp. Ex. 5 PI(Preparation 3):CPI (75:25) | 6 | 10 | 1.21 | 113 | 562.8 |
| Comp. Ex. 6 PI(Preparation 3):CPI (50:50) | 6 | 10 | 1.28 | 128 | 563.2 |
| Comp. Ex. 7 PI(Preparation 3):CPI (25:75) | 6 | 10 | 1.31 | 131 | 564.1 |

According to the results of Table 1, it is found that the polyimide film of Comparative Example 1, which contains only CPI having a large surface charge accumulation, exhibits high saturated electrostatic voltage and half-life but low heat resistance. On the other hand, it is found that the polyimide films of Examples 1 to 3 which are prepared by mixing CPI with PI having excellent heat resistance and mechanical properties, have the improved heat resistance compared to that of Comparative Example 1. Specifically, the polyimide films of Examples 1 to 3 have a saturated electrostatic voltage of 1.35 kV or more and 1.5 kV or less, a half-life time of 135 seconds or more and 190 seconds or less, and a thermal decomposition temperature (Td1%) of 570° C. or more and 575° C. or less.

In addition, it was confirmed that the polyimide films of Examples 1 to 3 have a high saturated electrostatic voltage, a long half-life time, and also a high thermal decomposition temperature, compared to the polyimide films of Comparative Examples 2 to 4 that do not contain CPI. In particular, the film of Comparative Example 4 was prepared by using the polyamic acid of Preparation Example 4 as the second polyamic acid, the polyamic acid being prepared by using an acid dianhydride in an excess amount relative to diamine unlike other Preparation Examples. As a result, it can be seen that saturated electrostatic voltage, half-life time, and thermal decomposition temperature characteristics are all poor.

In addition, it is found that the polyimide films of Comparative Examples 5 to 7 in which a BPDA-pPDA-ODA structure is used as the second polyamic acid, has a low saturated electrostatic voltage, a short half-life time and a low thermal decomposition temperature compared to the polyimide films of Examples 1 to 3.

From the above, it can be seen that the polyimide films according to the present invention have large surface charge accumulation, less charge leakage and excellent heat resistance compared to the polyimide films of Comparative Examples 1 to 7.

Accordingly, in the present invention, a first polyamic acid end-capped with a reactive end-capper are used in combination of a second polyamic acid not end-capped, the first and second polyamic acids being based on BPDA-pPDA. As a result, the resulting polyimide film can have the improved surface charge accumulation as well as the improved heat resistance. Therefore, such a polyimide film can be suitable as a substrate for a flexible device that requires a high temperature process.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A polyimide precursor composition comprising:
    a first polyamic acid having a repeating structure of the following formula 1 and having a reactive end capper having a reactive functional group; and
    a second polyamic acid having a repeating structure of the following formula 2:

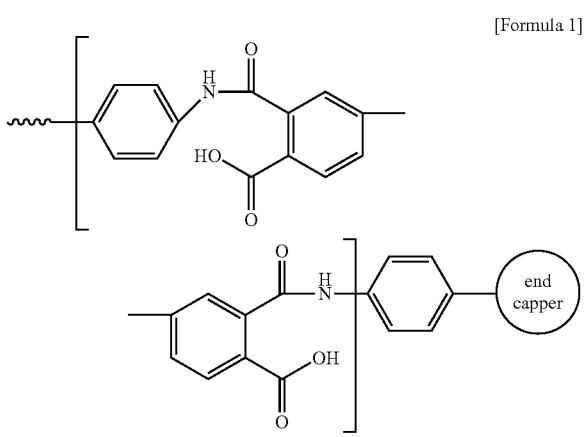

[Formula 1]

[Formula 2]

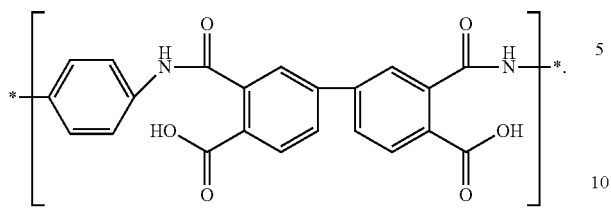

wherein the first polyamic acid and the second polyamic acid are contained in a molar ratio of 20:80 to 80:20.

2. The polyimide precursor composition according to claim 1, wherein the reactive functional group of the reactive end capper in the formula 1 is at least one reactive structure selected from a maleic-based reactive structure, a cyclobutene-based reactive structure, an acetylene-based reactive structure, a nadic-based reactive structure, an epoxy-based reactive structure or a phenylethynyl-based reactive structure.

3. The polyimide precursor composition according to claim 1, wherein the reactive end capper in the formula 1 is any one structure selected from the structures of the following structural formulae 1 to 6:

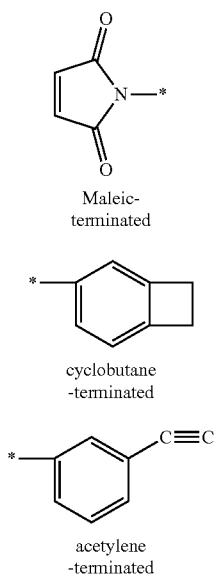

(1) Maleic-terminated (2) cyclobutane-terminated (3) acetylene-terminated (4) 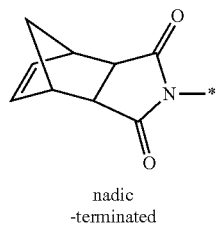 nadic-terminated (5) 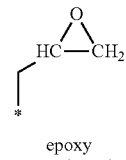 epoxy-terminated (6) 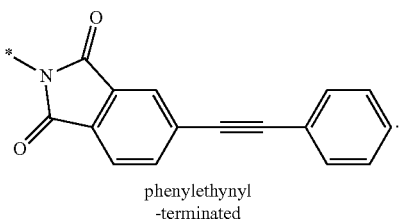 phenylethynyl-terminated 4. The polyimide precursor composition according to claim 1, wherein each of the first polyamic acid and the second polyamic acid comprises a reaction product of para-phenylenediamine and 3,3',4,4'-biphenylcarboxylic dianhydride, and the reaction product is obtained by reacting the para-phenylenediamine in excess of the equivalent ratio relative to the 3,3',4,4'-biphenylcarboxylic dianhydride.

5. The polyimide precursor composition according to claim 4, wherein the first polyamic acid is a reaction product from reacting the para-phenylenediamine with the 3,3',4,4'-biphenylcarboxylic dianhydride in the presence of 1 to 10 moles of the reactive end capper based on 100 moles of para-phenylenediamine.

6. A polyimide film comprising a cured product of the polyimide precursor composition according to claim 1.

7. A method for manufacturing a polyimide film comprising:
   applying the polyimide precursor composition according to claim 1 onto a carrier substrate; and
   heating and curing the polyimide precursor composition.

8. The polyimide film according to claim 6, wherein the polyimide film comprises:
   a first polyimide having a repeating structure of the following formula 1-1; and
   a second polyimide having a repeating structure of the following formula 2-1:

[Formula 1-1]

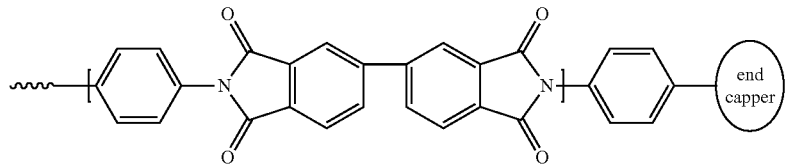

-continued

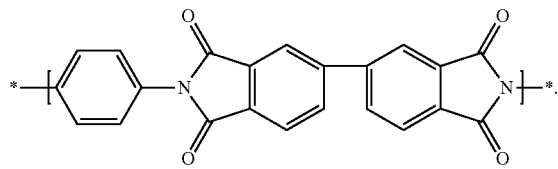

[Formula 2-1]

9. The polyimide film according to claim 8, wherein the first polyimide having the repeating structure of the formula 1-1 comprises a cross-linked structure represented by the following formula 1-1a by a reactive functional group:

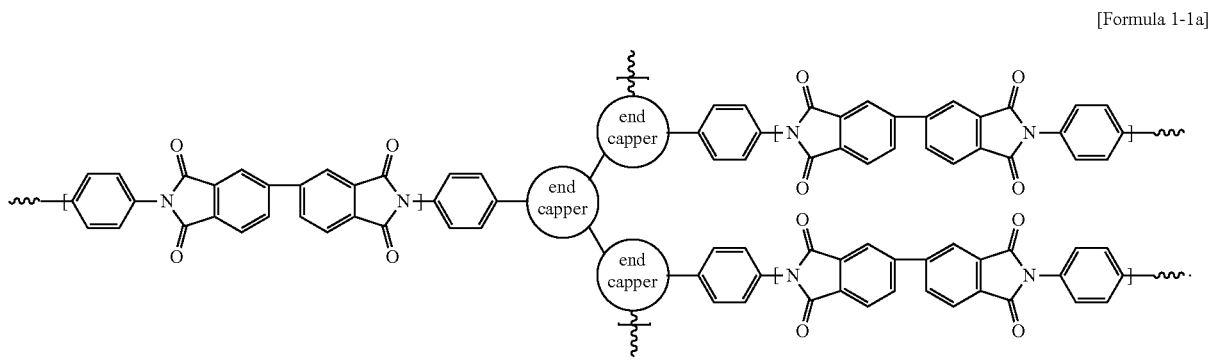

[Formula 1-1a]

10. The polyimide film according to claim 6, wherein the polyimide film has a saturated electrostatic voltage of at least 1.3 kV and a half-life time of at least 135 seconds as measured using a corona discharge method at a thickness of about 6 μm and a thermal decomposition temperature (Td1%) of at least 570° C.

11. A flexible device comprising the polyimide film according to claim 6 as a substrate.

12. A process for producing a flexible device comprising:
applying the polyimide precursor composition according to claim 1 on a carrier substrate;
heating the polyimide precursor composition to imidize polyamic acid, thereby forming a polyimide film;
forming a device on the polyimide film; and
peeling off the polyimide film on which the device is formed from the carrier substrate.

13. The process for producing a flexible device according to claim 12, wherein the process comprises an LTPS (low temperature polysilicon) process, an ITO process or an oxide process.

14. A polyimide film comprising a cured product of the polyimide precursor composition according to claim 2.

15. A polyimide film comprising a cured product of the polyimide precursor composition according to claim 3.

16. A polyimide film comprising a cured product of the polyimide precursor composition according to claim 4.

17. A polyimide film comprising a cured product of the polyimide precursor composition according to claim 5.

* * * * *